United States Patent
Keshavaraj

(10) Patent No.: US 10,583,801 B2
(45) Date of Patent: Mar. 10, 2020

(54) COATED AIRBAG COMPRISING A FILLED, CROSS-LINKED SILICONE POLYMER

(71) Applicant: MILLIKEN & COMPANY, Spartanburg, SC (US)

(72) Inventor: Ramesh Keshavaraj, Peachtree City, GA (US)

(73) Assignee: Milliken & Company, Spartanburg, SC (US)

( * ) Notice: Subject to any disclaimer, the term of this patent is extended or adjusted under 35 U.S.C. 154(b) by 841 days.

(21) Appl. No.: 14/327,167

(22) Filed: Jul. 9, 2014

(65) Prior Publication Data

US 2015/0048606 A1 Feb. 19, 2015

Related U.S. Application Data

(60) Provisional application No. 61/865,828, filed on Aug. 14, 2013.

(51) Int. Cl.
| | | |
|---|---|---|
| *B60R 21/235* | (2006.01) | |
| *C09D 183/08* | (2006.01) | |
| *C09D 183/04* | (2006.01) | |
| C08G 77/14 | (2006.01) | |
| C08G 77/12 | (2006.01) | |
| C08G 77/20 | (2006.01) | |
| C08G 77/26 | (2006.01) | |

(52) U.S. Cl.
CPC .......... *B60R 21/235* (2013.01); *C09D 183/04* (2013.01); *C09D 183/08* (2013.01); *B60R 2021/23514* (2013.01); *B60R 2021/23533* (2013.01); *C08G 77/12* (2013.01); *C08G 77/14* (2013.01); *C08G 77/20* (2013.01); *C08G 77/26* (2013.01)

(58) Field of Classification Search
CPC .. C08K 5/56; C08K 9/06; C08L 83/00; C09D 183/04; C09D 183/08; B60R 2021/23514; B60R 2021/23533; B60R 21/235; C08G 77/12; C08G 77/14; C08G 77/20; C08G 77/26
USPC ......... 428/34.1, 34.6, 34.7, 35.7, 36.1, 36.2, 428/36.8, 36.9, 36.91, 36.92, 402, 403, 428/404, 405, 407, 446, 447, 492; 442/59, 76, 164, 168, 169, 170, 171, 181, 442/228, 229, 230, 231, 237, 286, 293, 442/294; 525/475, 477; 280/728.1, 741, 280/743.1, 743.2; 427/387
See application file for complete search history.

(56) References Cited

U.S. PATENT DOCUMENTS

| | | | | |
|---|---|---|---|---|
| 5,254,621 A | * | 10/1993 | Inoue | B60R 21/235 280/728.1 |
| 5,258,211 A | * | 11/1993 | Momii | C09D 183/04 280/728.1 |
| 5,691,407 A | | 11/1997 | Azechi et al. | |
| 5,928,721 A | * | 7/1999 | Parker | B60R 21/235 427/197 |
| 5,977,216 A | | 11/1999 | Meguriya et al. | |
| 6,037,279 A | * | 3/2000 | Brookman | D06N 3/128 280/728.1 |
| 6,200,915 B1 | * | 3/2001 | Adams | D06N 3/0063 280/728.1 |
| 6,220,309 B1 | | 4/2001 | Sollars, Jr. | |
| 6,354,620 B1 | * | 3/2002 | Budden | C09D 183/04 106/287.13 |
| 6,369,184 B1 | * | 4/2002 | Bohin | B60R 21/235 528/15 |
| 6,476,098 B1 | * | 11/2002 | Arakawa | C08G 83/001 523/204 |
| 6,595,244 B1 | | 7/2003 | Sollars, Jr. | |
| 6,846,004 B2 | * | 1/2005 | Parker | C08L 83/04 106/18.12 |
| 7,069,961 B2 | | 7/2006 | Sollars, Jr. | |
| 7,385,000 B2 | | 6/2008 | Kuhn et al. | |
| 7,407,898 B2 | * | 8/2008 | Parker | C08G 77/442 428/446 |
| 7,409,970 B2 | | 8/2008 | Sollars, Jr. | |
| 7,543,609 B2 | | 6/2009 | Sollars, Jr. | |

(Continued)

FOREIGN PATENT DOCUMENTS

| | | |
|---|---|---|
| EP | 0 382 370 A1 | 8/1990 |
| EP | 0 787 772 A2 | 8/1997 |
| EP | 0 808 868 A1 | 11/1997 |

OTHER PUBLICATIONS

Jung et al., Preparation and Characteristics of High Voltage Liquid Silicone Rubber by Modified Cross-linking Agent, *Transactions on Electrical and Electronic Materials*, vol. 10, No. 1 Feb. 25, 2009 pp. 9-15, Department of Polymer Science and Engineering, Pusan National University, Jangjeon 2-dong, Geumjeong-gu, Pusan 609-735, Republic of Korea.

Park, Mechanical Properties and Processibility of Glass-Fiber-, Wollastonite-, and Fluoro-Rubber-Reinforced Silicone Rubber Composites, *Journal of Applied Polymer Science*, vol. 105, pp. 460-468 (2007), Wiley Periodicals, Inc., Youngchang Silicone Company Limited, 481-7, Gasan-Dong, Kumchun-Gu, Seoul 153-803, Korea.

(Continued)

*Primary Examiner* — Arti Singh-Pandey
(74) *Attorney, Agent, or Firm* — Cheryl J. Brickey

(57) ABSTRACT

An airbag comprises a textile substrate and a coating on at least a portion of the surface of the substrate. An airbag module comprises an airbag, a gas generator connected to the airbag, and a cover at least partially enclosing the airbag and the gas generator. A process for producing an airbag comprises the steps of providing a textile substrate, providing a coating composition, applying the coating composition to the substrate, and heating the textile substrate. A system for producing a filled, cross-linked silicone polymer comprises a first part and a second part. Each part comprises a polysiloxane compound and a plurality of filler particles.

20 Claims, No Drawings

(56) References Cited

U.S. PATENT DOCUMENTS

| | | | |
|---|---|---|---|
| 7,642,331 B2 * | 1/2010 | Pouchelon | C09D 183/04 |
| | | | 428/365 |
| 8,143,329 B2 * | 3/2012 | Proctor | C08K 3/346 |
| | | | 523/212 |
| 8,329,831 B2 | 12/2012 | Rapson | |
| 2003/0211340 A1 * | 11/2003 | Ikeno | C09D 183/04 |
| | | | 428/447 |
| 2008/0139731 A1 * | 6/2008 | Lawson | C08L 83/04 |
| | | | 524/447 |
| 2010/0282410 A1 * | 11/2010 | Pouchelon | C09D 183/04 |
| | | | 156/329 |

OTHER PUBLICATIONS

Hamdani et al., Flame Retardancy of Silicone-Based Materials, *ScienceDirect, Polymer Degradation and Stability*, 94 (2009) pp. 465-495, Centre des Matériaux de Grande Diffusion, Ecole des Mines d'Alés, 6 avenue de Clavières 30319 ALEX Cedex, France.
Paul, et al., Fillers for Polysiloxane ("Silicone") Elastomers, *ScienceDirect Progress in Polymer Science* 35 (2010) pp. 893-901, Department of Chemical Engineering University of Texas at Austin, Austin, TX 78712-1062, United States.

* cited by examiner

COATED AIRBAG COMPRISING A FILLED, CROSS-LINKED SILICONE POLYMER

CROSS-REFERENCE TO RELATED PATENT APPLICATIONS

This application claims, pursuant to 35 U.S.C. § 119(e) (1), priority to and the benefit of the filing date of U.S. Patent Application No. 61/865,828 filed on Aug. 14, 2013.

TECHNICAL FIELD OF THE INVENTION

The invention provides a coating composition suitable for use on airbags, an airbag coated with such a composition, a process for making such an airbag, and an airbag module comprising such an airbag. The invention also provides a system for producing a filled, cross-linked silicone polymer, which system can be used in making the coating composition.

BACKGROUND

Airbags for motor vehicles have become ubiquitous in passenger vehicles. These airbags are installed at strategic points in the passenger compartment of a vehicle and, in the event of a collision, are rapidly inflated with gas so that they act as an energy absorbing barrier between the vehicle occupant and an interior surface of the passenger compartment (e.g., steering wheel, dashboard, or windows). For example, side curtain airbags typically are installed within one or more of the pillars of the vehicle so that they provide protection during roll-over or side impact collisions. With the advent of such airbags, manufacturers began coating the airbag fabric to modify the gas permeability of the fabric, enabling the airbags manufactured from the fabric to stay inflated for longer periods of time and provided the needed protection during the collision event.

There are many types of coating compositions used to produce such coated fabrics, but one class of coating composition that is becoming quite popular in the airbag industry is based on silicone elastomers. Silicone elastomers provide a great degree of flexibility in modifying the gas permeability of the fabric. Silicone elastomers also provide appreciable heat protection, which is beneficial given the high amount of heat to which the airbag can be exposed during its life in the automobile and the heat that is produced by the gas generator when the airbag is deployed. Despite these benefits, silicone elastomers themselves tend to be very weak. Therefore, they are frequently reinforced with fillers in order to produce a coating having the desired degree of tensile strength. The use of such reinforcing fillers is not without difficulties. These fillers often interact with the raw materials used to form the silicone elastomer, which can result in creep hardening as the filler and components are mixed or bin ageing as the mixed components are stored for later use. If unchecked, these effects can limit the utility of silicone elastomer-based coating compositions. These problems can be addressed to some degree using additional additives, but this complicates the compounding and increases the cost of the coating composition.

In view of the foregoing, it can be seen that a need remains for improved silicone elastomer-based coating compositions and coated airbag fabrics that can meet the demanding needs of the automotive airbag industry while addressing some of the problems inherent in current coating compositions and coated fabrics. Applicants believe that the coating composition and coated airbag described in the present application meet this need.

BRIEF SUMMARY OF THE INVENTION

In a first embodiment, the invention provides an airbag comprising:
(a) a textile substrate, the textile substrate having at least one surface; and
(b) a coating on at least a portion of the surface of the textile substrate, the coating comprising:
  (i) a cross-linked silicone polymer; and
  (ii) a plurality of filler particles, at least a portion of the filler particles being bound to the cross-linked silicone polymer through a silicon compound covalently bonded to a surface of the filler particle.

In a second embodiment, the invention provides a process for producing an airbag, the process comprising the steps of:
(a) providing a textile substrate, the textile substrate having at least one surface;
(b) providing a coating composition, the coating composition comprising:
  (i) a first polysiloxane compound;
  (ii) a second polysiloxane compound, the second polysiloxane compound comprising one or functional groups that reacts with a functional group present on the first polysiloxane compound to produce a covalent bond between the second polysiloxane compound and the first polysiloxane compound; and
  (iii) a plurality of filler particles, the filler particles having a silicon compound covalently bonded to a surface of the filler particle, the silicon compound comprising one or more functional groups that reacts with a functional group present on the first polysiloxane compound to produce a covalent bond between the silicon compound and the first polysiloxane compound;
(c) applying the coating composition to at least a portion of the surface of the textile substrate; and
(d) heating the textile substrate to a temperature sufficient for the first polysiloxane compound and the second polysiloxane compound to react and form a cross-linked silicone polymer on the surface of the textile substrate.

In a third embodiment, the invention provides an airbag module comprising:
(a) an airbag, the airbag enclosing an interior volume and comprising:
  (i) a textile substrate, the textile substrate having at least one surface; and
  (ii) a coating on at least a portion of the surface of the textile substrate, the coating comprising:
    (A) a cross-linked silicone polymer; and
    (B) a plurality of filler particles, at least a portion of the filler particles being bound to the cross-linked silicone polymer through a silicon compound attached to a surface of the filler particle;
(b) a gas generator, the gas generator being connected to the airbag so that at least a portion of gases produced by the gas generator are directed into the interior volume enclosed by the airbag; and
(c) a cover at least partially enclosing the airbag and the gas generator.

In a fourth embodiment, the invention provides a system for producing a filled, cross-linked silicone polymer, the system comprising:

(a) a first part comprising a first polysiloxane compound and a plurality of filler particles, wherein (1) the first polysiloxane compound has a molar mass of about 1,000 g/mol or more, (2) the filler particles have a specific surface area of 5 m$^2$/g or less, (3) the filler particles have a silicon compound covalently bonded to a surface of the filler particle, the silicon compound comprising one or more functional groups that reacts with a functional group present on the first polysiloxane compound to produce a covalent bond between the silicon compound and the first polysiloxane compound, and (4) the filler particles are present in the first part in an amount of about 20 to about 100 parts by weight per 100 parts of the first polysiloxane compound; and (b) a second part comprising a second polysiloxane compound and a plurality of filler particles, wherein (1) the second polysiloxane compound has a molar mass of about 1,000 g/mol or more and comprising one or more functional groups that reacts with a functional group present on the first polysiloxane compound to produce a covalent bond between the silicon compound and the first polysiloxane compound, (2) the filler particles have a specific surface area of 5 m$^2$/g or less, (3) the filler particles have a silicon compound covalently bonded to a surface of the filler particle, the silicon compound comprising one or more functional groups that reacts with a functional group present on the first polysiloxane compound to produce a covalent bond between the silicon compound and the first polysiloxane compound, and (4) the filler particles are present in the second part in an amount of about 20 to about 100 parts by weight per 100 parts of the second polysiloxane compound;

wherein the first part is physically separated from the second part prior to mixing and curing to form the filled, cross-linked silicone polymer.

DETAILED DESCRIPTION OF THE INVENTION

In a first embodiment, the invention provides an airbag. The airbag can be suitable for use as any airbag in a motor vehicle, such as a frontal impact airbag (e.g., driver or passenger-side frontal impact airbag) or a side impact airbag (e.g., side curtain airbag or side torso airbag). The airbag comprises a textile substrate and a coating on at least a portion of the textile substrate. The airbag can also be configured to enclose an interior volume. For example, the airbag can comprise at least two discrete textile substrates that are sewn, stitched, or otherwise bonded together in such a way as to enclose an interior volume that can be inflated. Alternatively, the airbag can be a one-piece woven airbag, which essentially comprises a textile substrate having two layer areas and single layer areas where the two layers are woven together to enclose an interior volume that can be inflated. Such one-piece woven airbags and suitable constructions for the same are described, for example, in U.S. Pat. Nos. 7,543,609; 7,409,970; 7,069,961; 6,595,244; and 6,220,309.

The textile substrate of the airbag can be any suitable textile substrate. Preferably, the textile substrate is a woven fabric. Such woven fabrics comprise a plurality of yarns interlaced in a suitable weave pattern, such as a plain weave, twill weave or a satin weave. Preferably, the textile substrate is a woven fabric constructed in a plain weave. The woven fabric can be constructed from any suitable yarn or combination of yarns. Preferably, the textile substrate is a woven fabric comprising a plurality of synthetic yarns. The synthetic yarns can comprise any suitable synthetic fibers. Preferably, the synthetic yarns comprise fibers selected from the group consisting of polyamide fibers (e.g., nylon 6 fibers, nylon 6,6 fibers), polyester fibers (e.g., polyethylene terephthalate fibers, polytrimethylene terephthalate fibers, polybutylene terephthalate fibers), polyolefin fibers, and mixtures thereof. In a more preferred embodiment, the synthetic yarns comprise fibers selected from the group consisting of polyamide fibers, polyester fibers, and mixtures thereof. In one specific embodiment, the synthetic yarns comprise polyamide fibers. In another specific embodiment, the synthetic yarns comprise polyester fibers.

The yarns used in making the textile substrate can have any suitable linear density. Preferably, the yarns have a linear density of about 100 dtex or more or about 110 dtex or more. Preferably, the yarns have a linear density of about 1,500 dtex or less, or about 700 dtex or less. The yarns used in making the textile substrate preferably are multifilament yarns, which means each yarns comprises a plurality of filaments or fibers, such as those mentioned above. In such multifilament yarns, the filaments or fibers preferably have linear densities of about 7 dtex or less, or about 5 dtex or less (e.g., about 4.5 dtex or less).

In addition to the textile substrate, the airbag also comprises a coating on at least a portion of the surface of the textile substrate. The coating typically is applied to the surface of the textile substrate in order to modify the gas permeability of the airbag. Being able to modify the gas permeability of the airbag allows one to change the amount of time the airbag remains inflated after it is deployed. Preferably, the coating is substantially coextensive with the surface of the textile substrate, or at least substantially coextensive with that portion of the surface that overlies the enclosed volume of the airbag. The coating can be present on the textile substrate in any suitable amount. Preferably, the coating is present on the textile substrate in an amount of about 10 g/m$^2$ or more, about 15 g/m$^2$ or more, or about 20 g/m$^2$ or more. Preferably, the coating is present on the textile substrate in an amount of about 50 g/m$^2$ or less, about 45 g/m$^2$ or less, about 40 g/m$^2$ or less, or about 35 g/m$^2$ or less. Thus, in certain preferred embodiments, the coating is present on the textile substrate in an amount of about 10 to about 50 g/m$^2$ (e.g., about 15 to about 50 g/m$^2$ or about 20 to about 50 g/m$^2$), about 15 to about 45 g/m$^2$, about 20 to about 40 g/m$^2$, or about 20 to about 35 g/m$^2$.

The coating comprises a cross-linked silicone polymer and a plurality of filler particles. The filler particles have a silicon compound attached to their surface, and this silicon compound is bound to the cross-linked silicone polymer. The cross-linked silicone polymer and the coating preferably exhibit a moderate degree of flexibility. The flexibility of the coating is important since the airbag will remain folded in the airbag module for an extended period of time under potentially harsh conditions in the interior of the vehicle. The cross-linked silicone polymer preferably is a polymer produced by reacting a first polysiloxane compound with a second polysiloxane compound. The second polysiloxane compound preferably comprises a functional group that will react with another functional group on the first polysiloxane compound to produce a covalent bond between the two compounds. The first and second polysiloxane compounds preferably comprise a plurality of these reactive functional groups, which permits each molecule to react multiple times forming a network of cross-links in the cross-linked silicone polymer.

The first and second polysiloxane compounds used in producing the cross-linked silicone polymer can be any suitable polysiloxane compounds capable of reacting in the manner described above. For example, the first polysiloxane compound can comprise a plurality of silicon hydride (Si—H) groups and the second polysiloxane compound can comprise a plurality of vinyl groups. As will be understood by those familiar with the art, this combination of first and second polysiloxane compounds will react in the presence of a suitable catalyst to produce ethylene bridges that form cross-links between the compounds. In another example, the first polysiloxane compound can comprise epoxy groups (e.g., glycidyl ether groups) and the second polysiloxane compound can comprise groups that will react with the epoxy groups, such as amine groups (e.g., primary or secondary amine groups). Similarly, the second polysiloxane compound can comprise the epoxy groups and the first polysiloxane compound can comprise the groups that will react with the epoxy groups. In these embodiments, the epoxy group and the amine group will react to form amine groups that provide cross-links between the two compounds. In yet another example, the first and second polysiloxane compounds can comprise functional groups that will react in a condensation reaction to produce new siloxane linkages between the two compounds. For example, the first polysiloxane compound can comprise hydroxy groups bonded to silicon atoms in the compound and the second compound can comprise silyl ether groups or silyl ester groups. Similarly, the first polysiloxane compound can comprise the silyl ether groups or silyl ester groups and the second polysiloxane compound can comprise the hydroxy groups.

The first and second polysiloxane compounds preferably are moderate molecular mass polysiloxane compounds. Preferably, the first polysiloxane compound has a molar mass of about 1,000 g/mol or more, about 5,000 g/mol or more, about 10,000 g/mol or more, about 15,000 g/mol or more, about 20,000 g/mol or more, about 25,000 g/mol or more, or about 30,000 g/mol or more. Most preferably, the first polysiloxane compound has a molar mass of about 30,000 to about 40,000 g/mol (e.g., about 30,000 to about 35,000 g/mol). Preferably, the second polysiloxane compound has a molar mass of about 1,000 g/mol or more, about 5,000 g/mol or more, about 10,000 g/mol or more, about 15,000 g/mol or more, about 20,000 g/mol or more, about 25,000 g/mol or more, or about 30,000 g/mol or more. Most preferably, the second polysiloxane compound has a molar mass of about 30,000 to about 40,000 g/mol (e.g., about 30,000 to about 35,000 g/mol).

The filler particles can be any suitable filler particles for the coating. Suitable examples of filler particles include, but are not limited to, cristobalite, fumed silica, glass fiber, kaolin or other types of clay, talc, precipitated silica, quartz, wollastonite, inorganic oxides, mica, silicate fillers, graphene, barium sulfate, calcium carbonate, carbon black, metal hydroxides, and mixtures thereof. In a preferred embodiment, the filler particles can be metal hydroxide particles. The metal hydroxide particles can comprise any suitable metal hydroxide compound. Preferably, the metal hydroxide particles comprise a metal hydroxide compound that decomposes at elevated temperatures to yield a metal oxide and water. The endothermic decomposition of the metal hydroxide compound absorbs heat, which helps to delay ignition of combustible materials (e.g., the synthetic fibers in the textile substrate). Also, water produced by the decomposition displaces oxygen and/or combustible gases, further retarding combustion. Thus, when such a metal hydroxide compound is used, the metal hydroxide particles serve as a flame retardant and also act to absorb heat from the hot gases generated when the airbag is deployed. These hot gases can lead to hot spots in the airbag that can burn vehicle occupants when they contact the spots. Suitable metal hydroxides include alkali metal hydroxides, alkaline earth metal hydroxides, and group 13 metal hydroxides. In order to maximize the benefits discussed above, the metal hydroxide compound preferably decomposes at a relatively low temperature, such as below 350° C., more preferably below 250° C. and most preferably below about 200° C. In a preferred embodiment, the metal hydroxide particles comprise a metal hydroxide compound selected from the group consisting of magnesium hydroxide, aluminum hydroxide, and mixtures thereof. In a specific preferred embodiment, the metal hydroxide particles comprise aluminum hydroxide.

The filler particles can have any suitable specific surface area. Preferably, the filler particles have a specific surface area of 5 $m^2/g$ or less, more preferably about 3 $m^2/g$ or less or about 2 $m^2/g$ or less. The specific surface area of the filler particles can be determined using any suitable technique. Preferably, the specific surface area is measured using the Brunauer-Emmett-Teller (BET) method.

The filler particles can have any suitable size and particle morphology. While not wishing to be bound to any particular theory, it is believed that filler particles having a relatively small mean particle size, such as less than 5 μm, can cause unacceptable increases in the viscosity of the coating composition used to produce the coating on the textile substrate. Also, it is believed that filler particles having a substantially spherical shape can similarly lead to unacceptable increases in the viscosity of the coating composition. Thus, in a preferred embodiment, the filler particles have a mean particle size of about 5 μm or more, more preferably about 10 μm or more, or about 15 μm or more. Also, the filler particles preferably have a substantially plate-like particle morphology.

As noted above, the filler particles have a silicon compound attached to their surface. The silicon compound comprises at least one functional group that is capable of reacting with a functional group on the first polysiloxane compound. Thus, the particular silicon compound will depend upon the particular polysiloxane compounds that are used to produce the cross-linked silicone polymer. For example, if the first polysiloxane compound comprises silicon hydride groups, then the silicon compound preferably comprises vinyl groups. Other suitable combinations of functional groups for the silicon compound and the first polysiloxane compound include those discussed above in connection with the first and second polysiloxane compounds used in making the cross-linked silicone polymer.

Metal hydroxide particles, which are one of the examples of filler particles suitable for use in the invention, have a plurality of hydroxy groups on their surface. These hydroxy groups provide a means for attaching the silicon compound to the surface of the metal hydroxide particles. For example, these hydroxy groups can react in a condensation reaction with a hydroxy-bearing silicon atom, a silyl ether group, or a silyl ester group in the silicon compound. The condensation reaction creates a Si—O bond between the silicon compound and the surface of the metal hydroxide particle. One suitable example of a silicon compound that can be used in combination with metal hydroxide particles is dimethyl(vinyl)silanol, which would be used when the first polysiloxane compound comprises silicon hydride groups.

The silicon compound can be present on the filler particles in any suitable amount. The silicon compound preferably is present in an amount of about 0.1 wt. % or more, about 0.2 wt. % or more, about 0.3 wt. % or more, about 0.4 wt. % or more, about 0.5 wt. % or more, about 0.6 wt. % or more, about 0.7 wt. % or more, about 0.8 wt. % or more, about 0.9 wt. % or more, or about 1.0 wt. % or more (e.g., about 1.2 wt. %) based on the weight of the filler particles.

The filler particles can be present in the coating in any suitable amount. The filler particles preferably are present in the coating in an amount of about 20 parts by weight or more per 100 parts of the cross-linked silicone polymer. More preferably, the filler particles are present in the coating in an amount of about 50 parts by weight or more (e.g., about 70 parts by weight) per 100 parts of the cross-linked silicone polymer. In another preferred embodiment, the filler particles preferably are present in the coating in an amount of about 100 parts by weight or less per 100 parts of the cross-linked silicone polymer. Thus, in a series of preferred embodiments, the filler particles are present in the coating in an amount of about 20 to about 100 parts by weight or about 50 to about 100 parts by weight per 100 parts of the cross-linked silicone polymer.

The coating can comprise other components in addition to the cross-linked silicone polymer and the filler particles. For example, the coating can further comprise an adhesion promoter or coupling agent to improve adhesion between the cross-linked silicone polymer and the surface of the textile substrate. Suitable adhesion promoters are known in the art and such adhesion promoters are believed to be suitable for use in the coating. Examples of suitable adhesion promoters include, but are not limited to, (3-glycidoxypropyl) trimethoxysilane, 3-(triethoxysilyl)propyl isocyanate, and mixtures thereof. The coating can also comprise reinforcing fillers, though any such reinforcing fillers typically are present in a relatively minor amount relative to the treated filler particles described above. A reinforcing filler suitable for use in the coating is silica, with fumed silica being particularly preferred.

The airbag can be produced by any suitable process. However, in another embodiment, the invention provides a process for producing an airbag. The process comprises the steps of: (a) providing a textile substrate; (b) providing a coating composition; (c) applying the coating composition to at least a portion of the surface of the textile substrate; and (d) heating the textile substrate to a temperature sufficient for the polysiloxane compounds in the coating composition to react and form a cross-linked silicone polymer. The textile substrate used in the process can be any suitable substrate, including those described above in connection with the airbag embodiment of the invention.

The coating composition comprises a first polysiloxane compound, a second polysiloxane compound, and a plurality of filler particles. The first polysiloxane compound and the second polysiloxane compound suitable for use in the process are described above in connection with the cross-linked silicone polymer. As explained above, the first and second polysiloxane compounds each comprise functional groups that will react to form covalent bonds between molecules of the first and second polysiloxane compounds.

The filler particles suitable for use in the process are described above in connection with the airbag embodiment of the invention. As explained above, the filler particles comprise a silicon compound covalently bonded to the surface of the individual filler particles. The silicon compound is selected so that it comprises one or more functional groups that will react with a functional group present on the first polysiloxane compound to produce a covalent bond between the silicon compound and the first polysiloxane compound. Suitable combinations of silicon compounds and first polysiloxane compounds are described above in connection with the airbag embodiment of the invention.

The filler particles can be present in the coating composition in any suitable amount. Preferably, the filler particles are present in the coating composition in an amount of about 20 parts by weight or more per 100 parts of the first polysiloxane compound. More preferably, the filler particles are present in the coating composition in an amount of about 50 parts by weight or more per 100 parts of the first polysiloxane compound. Preferably, the amount of filler particles in the coating composition does not exceed about 100 parts by weight per 100 parts of the polysiloxane compounds.

The coating composition can comprise other components in addition to the first polysiloxane compound, the second polysiloxane compound, and filler particles. For example, the coating composition can comprise fillers and/or adhesion promoters as discussed above. Further, the coating composition typically comprises one or more catalysts to modify the rate of reaction between the first and second polysiloxane compounds and the silicon compound on the filler particles. The particular catalyst used will depend on the reactive groups present on the first and second polysiloxane compounds and the silicon compound on the filler particles. For example, a platinum-containing catalyst typically is used as the catalyst for addition cure systems (e.g., systems in which one component contains silicon hydride groups and the other component contains vinyl groups). A tin-containing catalyst typically is used as the catalyst for condensation cure systems (e.g., systems in which one component contains hydroxy groups bonded to silicon atoms and the other components contains silyl ether groups or silyl ester groups).

The coating composition can have any suitable viscosity. As noted below, the coating composition preferably is directed coated onto the textile substrate and, therefore, the coating composition preferably has a viscosity that is suitable for such coating processes. Preferably, the coating composition has a viscosity of about 50 cP or more, about 100 cP or more, about 1,000 cP or more, or about 10,000 cP or more. The coating composition preferably has a viscosity of about 300,000 cP or less, about 250,000 cP or less, or about 200,000 cP or less. Thus, in a preferred embodiment, the coating composition preferably has a viscosity of about 50 to about 300,000 cP, about 100 to about 250,000 cP, about 1,000 to about 200,000 cP, or about 10,000 to about 200,000 cP. The coating composition preferably exhibits shear thinning. For example, in one embodiment, the coating composition exhibits a viscosity of about 150,000 to about 200,000 cP at a shear rate of about 1 $s^{-1}$ but then exhibits a viscosity of about 60,000 cP or less (e.g., about 30,000 to about 50,000 cP) at a shear rate of about 20 $s^{-1}$ or more.

It is believed that the viscosity of the coating composition can be controlled by careful selection of the particle size of the filler particles. For example, if a relatively small particle size filler particle is used, then a relatively large number of individual filler particles must be added to achieve the desired weight loading of the filler particles. With such a large number of individual particles present in the coating composition, the coating composition will show a greater resistance to deformation by shear stress. Thus, the viscosity of the coating composition will be much higher—especially at relatively low shear rates—as compared to a similar coating composition without the filler particles. However, if a relatively large particle size filler is used (such as particles having the sizes mentioned above), a smaller number of individual filler particles must be added to achieve the desired loading. With a small number of individual particles present, the viscosity of the coating composition shows only a modest increase as compared to a similar coating composition without the filler particles.

The coating composition can be applied to the textile substrate using any suitable process or coating technique. Preferably, the coating composition is direct coated onto the textile substrate and the thickness of the resulting coating is determined by a gap between a knife and the surface of the textile substrate.

The coating composition can be applied to the textile substrate in any suitable amount. The exact amount to be applied will be determined by a variety of factors, such as the air permeability of the uncoated textile substrate, the desired air permeability of the coated textile substrate, and the characteristics of the coating composition. Suitable amounts for the coating are described above in connection with the airbag embodiment of the invention.

Following application of the coating composition, the textile substrate is heated to produce a cross-linked silicone polymer on the surface of the textile substrate. Heating the substrate to an elevated temperature helps to accelerate the reaction between the reactive groups present on the first polysiloxane compound and the reactive groups present on the second polysiloxane compound and the silicon compound on the filler particles.

In a third embodiment, the invention provides an airbag module. The airbag module comprises an airbag, a gas generator, and a cover at least partially enclosing the airbag and gas generator. The airbag can be any suitable embodiment of the airbag discussed in the first embodiment of the invention. The gas generator in the airbag module can be any suitable apparatus that rapidly produces a sufficient volume of gas (or a mixture of gases) to fill the interior volume of the airbag. Suitable gas generators are known to those of ordinary skill in the art, and it is believed that any of these known gas generators will be suitable for use in making the airbag module described herein. The gas generator is connected to the airbag so that at least a portion of the gases generated by the airbag are directed into the interior volume enclosed by the airbag. The airbag module further comprises a cover that at least partially encloses the airbag and the gas generator. The cover can be made from any suitable material, such as a rigid plastic that will protect the airbag and gas generator when they are installed in the motor vehicle.

In a fourth embodiment, the invention provides a system for producing a filled, cross-linked silicone polymer. The system is a multi-part system comprising a first part and a second part. The first part comprises a first polysiloxane compound and a plurality of filler particles. The first polysiloxane compound can be any of the polysiloxane compounds discussed above in connection with the other embodiments of the invention. The filler particles present in the first part can be any of the filler particles discussed above in connection with the other embodiments of the invention. The filler particles can be present in the first part in any suitable amount. Preferably, the filler particles are present in the first part in an amount of about 20 parts by weight or more (e.g., about 20 to about 100 parts by weight) or about 50 parts by weight or more (e.g., about 50 to about 100 parts by weight) per 100 parts of the first polysiloxane compound.

The second part of the system comprises a second polysiloxane compound a plurality of filler particles. The second polysiloxane compound can be any of the polysiloxane compounds discussed above in connection with the other embodiments of the invention. The filler particles present in the second part can be any of the filler particles discussed above in connection with the other embodiments of the invention. The filler particles can be present in the second part in any suitable amount. Preferably, the filler particles are present in the second part in an amount of about 20 parts by weight or more (e.g., about 20 to about 100 parts by weight) or about 50 parts by weight or more (e.g., about 50 to about 100 parts by weight) per 100 parts of the second polysiloxane compound.

The first part and the second part of the above-described system are physically separated from each other. The two parts are mixed by the end user when she desires to produce a filled, cross-linked silicone polymer. Each part of the system preferably exhibits a relatively low viscosity in order to facilitate mixing of the two parts and handling of the mixed system (i.e., the system after the two parts have been mixed). Preferably, the first part of the composition has a viscosity of about 50 cP or more, about 100 cP or more, about 1,000 cP or more, or about 10,000 cP or more. The first part of the system preferably has a viscosity of about 300,000 cP or less, about 250,000 cP or less, or about 200,000 cP or less. Thus, in a preferred embodiment, the first part preferably has a viscosity of about 50 to about 300,000 cP, about 100 to about 250,000 cP, about 1,000 to about 200,000 cP, or about 10,000 to about 200,000 cP. Preferably, the second part of the composition has a viscosity of about 50 cP or more, about 100 cP or more, about 1,000 cP or more, or about 10,000 cP or more. The second part of the system preferably has a viscosity of about 300,000 cP or less, about 250,000 cP or less, or about 200,000 cP or less. Thus, in a preferred embodiment, the second part preferably has a viscosity of about 50 to about 300,000 cP, about 100 to about 250,000 cP, about 1,000 to about 200,000 cP, or about 10,000 to about 200,000 cP. The first and second parts of the system preferably exhibit shear thinning. For example, in one embodiment, one part of the system exhibits a viscosity of about 150,000 to about 200,000 cP at a shear rate of about $1$ $s^{-1}$ but then exhibits a viscosity of about 60,000 cP or less (e.g., about 30,000 to about 50,000 cP) at a shear rate of about $20$ $s^{-1}$ or more.

The above-described system can be used to produce the coating described above in connection with the airbag embodiments of the invention. The system can also be used in the method described above. More generally, the above-described system can be used to produce a filled, cross-linked silicone polymer. In order to produce the filled, cross-linked silicone polymer, the first part and the second part are thoroughly mixed and the first polysiloxane compound and the second polysiloxane compound are allowed to react to produce the cross-linked silicone polymer. The reaction can be allowed to proceed at ambient conditions (e.g., room temperature), or the resulting mixture (i.e., the mixture resulting from combining the two parts) can be heated to an elevated temperature at which the reaction occurs.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,")

unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. An airbag enclosing an interior volume and comprising:
   (a) a textile substrate, the textile substrate having at least one surface; and
   (b) a flexible coating on at least a portion of the surface of the textile substrate, the coating comprising:
      (i) a first polysiloxane compound;
      (ii) a second polysiloxane compound, the second polysiloxane compound comprising one or functional groups that reacts with a functional group present on the first polysiloxane compound to produce a covalent bond between the second polysiloxane compound and the first polysiloxane compound; and
      (iii) a plurality of filler particles, the filler particles having a silicon compound covalently bonded to a surface of the filler particle, the silicon compound comprising one or more functional groups that reacts with a functional group present on the first polysiloxane compound to produce a covalent bond between the silicon compound and the first polysiloxane compound; wherein the plurality of filler particles have a specific surface area of 5 m2/g or less and are selected from the group consisting of magnesium hydroxide, aluminum hydroxide, and mixtures thereof.

2. The airbag of claim 1, wherein the textile substrate is a woven fabric comprising a plurality of synthetic yarns.

3. The airbag of claim 2, wherein the synthetic yarns comprise fibers selected from the group consisting of polyamide fibers, polyester fibers, polyolefin fibers, and mixtures thereof.

4. The airbag of claim 3, wherein the synthetic yarns comprise polyamide fibers.

5. The airbag of claim 3, wherein the synthetic yarns comprise polyester fibers.

6. The airbag of claim 1, wherein the filler particles comprise aluminum hydroxide.

7. The airbag of claim 1, wherein the silicon compound is covalently bonded to the surface of the filler particle through an oxygen atom.

8. The airbag of claim 1, wherein the silicon compound is covalently bonded to the cross-linked silicone polymer through a functional group selected from the group consisting of amine groups, siloxane groups, and alkyl groups.

9. The airbag of claim 1, wherein the filler particles are present in the coating in an amount of about 20 parts by weight or more per 100 parts of the cross-linked silicone polymer.

10. The airbag of claim 1, wherein the filler particles are present in the coating in an amount of about 50 parts by weight or more per 100 parts of the cross-linked silicone polymer.

11. An airbag module comprising: (1) an airbag, the airbag enclosing an interior volume and comprising (a) a textile substrate, the textile substrate having at least one surface; and
   (b) a flexible coating on at least a portion of the surface of the textile substrate, the coating comprising:
      (i) a first polysiloxane compound;
      (ii) a second polysiloxane compound, the second polysiloxane compound comprising one or functional groups that reacts with a functional group present on the first polysiloxane compound to produce a covalent bond between the second polysiloxane compound and the first polysiloxane compound; and
      (iii) a plurality of filler particles, the filler particles having a silicon compound covalently bonded to a surface of the filler particle, the silicon compound comprising one or more functional groups that reacts with a functional group present on the first polysiloxane compound to produce a covalent bond between the silicon compound and the first polysiloxane compound; wherein the plurality of filler particles have a specific surface area of 5 m2/g or less and are selected from the group consisting of magnesium hydroxide, aluminum hydroxide, and mixtures thereof,
   (2) a gas generator, the gas generator being connected to the airbag so that at least a portion of gases produced by the gas generator are directed into the interior volume enclosed by the airbag; and (4) a cover at least partially enclosing the airbag and the gas generator.

12. The airbag module of claim 11, wherein the textile substrate is a woven fabric comprising a plurality of synthetic yarns.

13. The airbag module of claim 12, wherein the synthetic yarns comprise fibers selected from the group consisting of polyamide fibers, polyester fibers, polyolefin fibers, and mixtures thereof.

14. The airbag module of claim 13, wherein the synthetic yarns comprise polyamide fibers.

15. The airbag module of claim 13, wherein the synthetic yarns comprise polyester fibers.

16. The airbag module of claim 11, wherein the filler particles comprise aluminum hydroxide.

17. The airbag module of claim 11, wherein the silicon compound is covalently bonded to the surface of the filler particle through an oxygen atom.

18. The airbag module of claim 11, wherein the silicon compound is covalently bonded to the cross-linked silicone polymer through a functional group selected from the group consisting of amine groups, ether groups, and alkyl groups.

19. The airbag module of claim 11, wherein the filler particles are present in the coating in an amount of about 20 parts by weight or more per 100 parts of the cross-linked silicone polymer.

20. The airbag module of claim 16, wherein the metal hydroxide particles are present in the coating in an amount of about 50 parts by weight or more per 100 parts of the cross-linked silicone polymer.

\* \* \* \* \*